United States Patent [19]

Wagner et al.

[11] Patent Number: 5,326,872

[45] Date of Patent: * Jul. 5, 1994

[54] PROCESS FOR PREPARATION OF ASYMMETRIC ISOINDOLINE PIGMENTS

[75] Inventors: Barbara J. Wagner, Charleston, S.C.; Bernd Kaletta, Leverkusen, Fed. Rep. of Germany

[73] Assignees: Miles Inc., Pittsburgh, Pa.; Bayer Aktiengesellschaft, Leverkusen, Fed. Rep. of Germany

[*] Notice: The portion of the term of this patent subsequent to Jan. 5, 2010 has been disclaimed.

[21] Appl. No.: 843,591

[22] Filed: Mar. 6, 1992

Related U.S. Application Data

[63] Continuation-in-part of Ser. No. 689,398, Apr. 22, 1991, Pat. No. 5,177,209.

[51] Int. Cl.$^5$ .............................................. C07D 403/04
[52] U.S. Cl. ................................... 544/300; 544/298; 544/301; 544/287; 544/249
[58] Field of Search ............... 544/301, 300, 298, 287, 544/249

[56] References Cited

U.S. PATENT DOCUMENTS

| | | | |
|---|---|---|---|
| 3,646,033 | 2/1972 | Leister et al. | 260/250 R |
| 3,794,659 | 2/1974 | Leister et al. | 260/305 |
| 3,991,054 | 11/1976 | Bock et al. | 260/256.4 C |
| 4,166,179 | 8/1979 | Lotsch | 544/296 |
| 4,316,023 | 2/1982 | Henning et al. | 544/300 |
| 4,401,815 | 8/1983 | Lotsch et al. | 544/300 |
| 4,426,533 | 1/1984 | Rochat et al. | 548/471 |
| 4,500,718 | 2/1985 | Rochat et al. | 548/471 |

FOREIGN PATENT DOCUMENTS 1140130  11/1980  Canada .

OTHER PUBLICATIONS

Patent Abstracts of Japan, vol. 2, No. 122 (C-78) (2599) Oct. 13, 1978 7 JP-A-53 092 759 (Asahi Kasei Kogyo K.K.) Aug. 15, 1978.

R. Baumann et al., "Isoindolenine als Zqischenprodukte der Phthalocyanin-Synthese", Agnew, Chem., 68, 133–150 (1956).

I. Chambrier and M. J. Cook, "Reaction of Phthalonitrile with Alkoxide Ions", J. Chem. Research, 322–323 (1990).

*Primary Examiner*—John M. Ford
*Attorney, Agent, or Firm*—Joseph C. Gil; Richard E. L. Henderson

[57] ABSTRACT

This invention relates to a process for preparing asymmetric isoindoline pigments of the formula

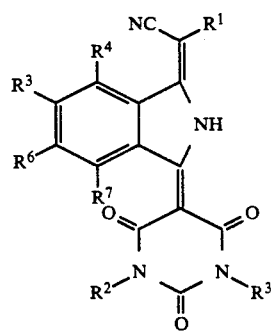

in which $R^1$ is an electron-withdrawing group, $R^2$ and $R^3$ are independently hydrogen, alkyl, or aryl, and $R^4$ $R^5$ $R^6$ and $R^7$ are independently hydrogen, halogen, alkyl, alkoxy, or aryloxy. The process employs an initial reaction of a 1,2-dicyanobenzene with an alcohol in an organic medium in the presence of a base. The resultant imino-isoindoline intermediate composition reacts without isolation with a cyanomethylene compound $NC-CH_2-R^1$ to form a partly condensed product that is then condensed, optionally without isolation, in the presence of water with barbituric acid or a derivative thereof to form the asymmetric isoindoline pigment.

16 Claims, No Drawings

PROCESS FOR PREPARATION OF ASYMMETRIC ISOINDOLINE PIGMENTS

This application is a continuation-in-part of application Ser. No. 07/689,398, filed Apr. 22, 1991. (now U.S. Pat. No. 5,177,209, issued Jan. 5, 1993).

BACKGROUND OF THE INVENTION

This invention relates to an improved process for preparing asymmetric isoindoline pigments having high brilliance and color strength and good light- and weather-fastness.

Compounds of formula I are valuable organic pigments previously described in the literature. Such compounds are disclosed, for example, in U.S. Pat. Nos. 3,991,054, 3,923,806, 3,987,045, 4,166,179, 4,262,120, 4,316,023, 4,400,507, 4,401,815, 4,599,113, 4,764,217, and 4,970,310 and in Canadian Patent 1,140,130. When describing preparative methods, however, the references disclose processes require an initial preparation of 1-amino-3-iminoisoindoline (also known as 1,3-diiminoisoindoline) (formula A)

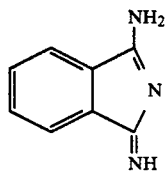

or ring-substituted derivatives thereof from 1,2-dicyanobenzene and ammonia. Cf. F. Baumann et al., *Angew. Chem.*, 68, 133–150 (1956). Thus, the technical and economical disadvantages of the disclosed methods include the need to convert 1,2-dicyano-benzene into this intermediate in an additional step when compared to the process of the present invention, coupled with safety and environmental problems associated with the need to handle ammonia. In addition, the processes disclosed in these references are typified by the isolation of all intermediates.

The use of dialkoxy isoindolines instead of 1-amino-3-imino-isoindoline avoids the need for ammonia. For example, U.S. Pat. Nos. 4,426,533 and 4,500,718 disclose the use of dialkoxy intermediates analogous to formula VIII (see below) prepared by the reaction of 1,2-dicyanobenzenes with alcoholate bases (formed in situ from a strong base in an alcohol). These patents, however, do not disclose the preparation of purely asymmetric compounds. Instead, the references describe a method for preparing symmetric bis(cyanomethylene) compounds by reaction of dialkoxy intermediates with a single cyanomethylene compound or a mixture containing both asymmetric and symmetric bis(cyanomethylene) compounds by reaction with a mixture of two different cyanomethylene compounds.

U.S. Pat. Nos. 3,646,033, and 3,794,659 disclose a stepwise method for using 1-amino-3-imino-isoindoline, dialkoxy isoindolines, and other such reactive isoindoline derivatives to prepare asymmetric isoindoline derivatives. These patents, however, teach the importance of removing impurities by isolating intermediates and thus, do not suggest methods in which intermediates are not isolated. E.g., Example 76 and Example 25 (note reference to German Patentschrift 879,102, which teaches isolation of 1-alkoxy-3-iminoisoindoline).

Therefore, an object of the present invention was to develop a procedure for synthesizing isoindoline pigments of formula I in pure asymmetric form and without the use of ammonia and 1-amino-3-imino-isoindoline and without the need to isolate intermediates.

SUMMARY OF THE INVENTION

This invention relates to a process for preparing an asymmetric isoindoline pigment of formula I

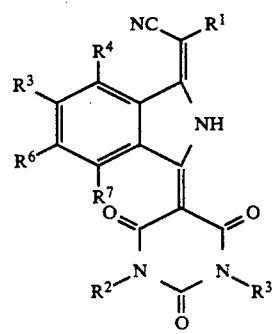

wherein
$R^1$ is an electron-withdrawing group, preferably those selected from the group consisting of
(1) cyano,
(2) aminocarbonyl or aminocarbonyl N-substituted with $C_1$-$C_6$ alkyl, $C_5$-$C_7$ cycloalkyl, $C_7$-$C_{15}$ aralkyl, or $C_6$-$C_{10}$ aryl,
(3) ($C_1$-$C_6$ alkoxy)carbonyl,
(4) ($C_6$-$C_{10}$ aryloxy)carbonyl,
(5) heteroaryl, preferably selected from the group consisting of
(a) a group of formula II

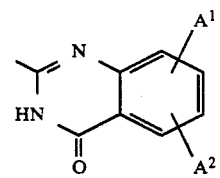

wherein $A^1$ and $A^2$ are independently hydrogen, halogen, $C_1$-$C_6$ alkyl, $C_1$-$C_6$ alkoxy, or ($C_1$-$C_6$ alkoxy)carbonyl, or $A^1$ and $A^2$ together form a fused-on benzene ring, and
(b) a group of formula III

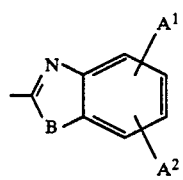

wherein $A^1$ and $A^2$ are defined as above and B is O, S, NH, or N($C_1$-$C_4$ alkyl);
$R^2$ and $R^3$ are independently
(1) hydrogen,
(2) $C_1$-$C_6$ alkyl, or
(3) $C_6$-$C_{10}$ aryl; and
$R^4$, $R^5$, $R^6$, and $R^7$ are independently
(1) hydrogen,
(2) halogen, (3) $C_1$–$C_6$ alkyl,
(4) $C_1$–$C_6$ alkoxy, or
(5) $C_6$–$C_{10}$ aryloxy; comprising
  (a) reacting a 1,2-dicyanobenzene of formula IV

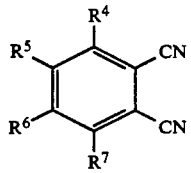

IV wherein $R^4$, $R^5$, $R^6$, and $R^7$ are defined as above, with an alcohol in an organic medium in the presence of a base, thereby forming an imino-isoindoline intermediate composition;
  (b) reacting the imino-isoindoline intermediate composition, without first isolating said intermediate composition, with about 0.9 to about 1.5 molar parts, relative to the 1,2-dicyanobenzene, of a cyanomethylene compound of formula V

NC—$CH_2$—$R^1$     V wherein $R^1$ is defined as above, thereby forming a semi-condensed product of formula VI

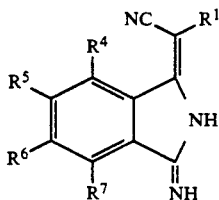

VI wherein $R^1$, $R^4$, $R^5$, $R^6$, and $R^7$ are defined as above; and
  (c) condensing the semi-condensed product, preferably without first isolating said semi-condensed product, in the presence of water at a temperature of about 30° C to about 100° C. and at a pH between about 1 and about 6 with about 1 to about 3 molar parts, relative to the 1,2-dicyanobenzene, of a barbituric acid derivative of formula VII

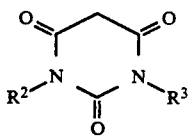

VII wherein $R^2$ and $R^3$ are defined as above, thereby forming the asymmetric isoindoline pigment of formula I.

DETAILED DESCRIPTION OF THE INVENTION

As used herein, the term "$C_1$–$C_6$ alkyl" refers to straight or branched chain aliphatic hydrocarbon groups having from 1 to 6 carbon atoms, also referred to as lower alkyl. Examples of $C_1$–$C_6$ al kyl are methyl, ethyl, propyl, butyl, pentyl, hexyl, and the isomeric forms thereof.

The term "$C_5$–$C_7$ cycloalkyl" refers to cycloaliphatic hydrocarbon groups having From 5 to 7 carbon atoms. Examples of $C_5$–$C_7$ cycloalkyl are cyclopentyl, cyclohexyl, and cycloheptyl.

The term "$C_6$–$C_{10}$ aryl" refers to phenyl and 1- or 2-naphthyl. As used herein, the term "aryl" also refers to phenyl and naphthyl groups further substituted with halogen, alkyl, alkoxy, alkoxycarbonyl, aryloxycarbonyl, or nitro as defined herein.

The term "$C_7$–$C_{15}$ aralkyl" refers to $C_1$–$C_6$ alkyl substituted with $C_6$–$C_{10}$ aryl such that the total number of carbon atoms is from 6 to 15. Examples of $C_7$–$C_{15}$ aralkyl are benzyl, phenethyl, and naphthylmethyl.

The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof.

The term "$C_6$–$C_{10}$ aryloxy" refers to phenoxy and 1- or 2-naphthoxy. As used herein, the term "aryloxy" also refers to phenoxy and naphthoxy groups further substituted with halogen, alkyl, alkoxy, alkoxycarbonyl, aryloxycarbonyl, or nitro as defined herein.

The term "($C_1$–$C_6$ alkoxy)carbonyl" refers to straight or branched chain alkoxycarbonyl groups having from 1 to 6 carbon atoms in the alkoxy portion. Examples of $C_1$–$C_6$ alkoxycarbonyl are methoxycarbonyl, ethoxycarbonyl, propoxycarbonyl, butoxycarbonyl, pentyloxycarbonyl, hexyloxycarbonyl, and the isomeric forms thereof.

The term "($C_6$–$C_{10}$ aryloxy)carbonyl" refers to phenoxycarbonyl and 1- or 2-naphthoxycarbonyl, in which the aryl portion can optionally be further substituted with halogen, alkyl, alkoxy, alkoxycarbonyl, or nitro.

The term "heteroaryl" refers to five- or six-membered aromatic groups having one or more ring heteroatoms, such as nitrogen, oxygen, and sulfur, and fused ring analogs thereof. The term "heteroaryl" also refers to heteroaryl groups further substituted with hydroxy (including tautomeric oxo forms), halogen, alkyl, alkoxy, alkoxycarbonyl, or aryloxycarbonyl. Suitable heteroaryl groups include those attached to the cyanomethylene at a ring carbon atom adjacent to one or two (preferably two) ring heteroatoms, such as 2-pyrimidinyl, 2-imidazolyl, 2-diazolyl, 2-thiazolyl, 2-oxazolyl, and the like. Particularly preferred heteroaryl groups are those having the formulas II and III.

Examples of halogen are fluorine, chlorine, bromine, and iodine.

The group $R^1$ can be any electron-withdrawing group known in the art that does not, under the reaction conditions encountered, decompose or otherwise undergo significant chemical reactions to form a group that is not itself an electron-withdrawing group. Preferred groups $R^1$ are those which undergo no chemical reaction at all under these conditions. In the preferred embodiments, $R^1$ is aminocarbonyl; N-($C_1$–$C_4$ alkyl)aminocarbonyl; N-phenylaminocarbonyl or N-phenylaminocarbonyl substituted in the phenyl ring by halogen, alkyl, alkoxy, or alkoxycarbonyl; a group of formula II in which $A^1$ and $A^2$ are hydrogen; or a group of formula III in which $A^1$ and $A^2$ are hydrogen and B is NH. Particularly preferred compounds of formula I are those in which $R^1$ is aminocarbonyl, N-methylaminocarbonyl, N-ethylaminocarbonyl, or N- phenylaminocarbonyl (optionally chlorinated in the phenyl ring).

Groups $R^2$ and $R^3$ can be hydrogen, alkyl, or aryl. In preferred embodiments, $R^2$ and $R^3$ are independently hydrogen, $C_1$-$C_4$ alkyl, phenyl, or phenyl substituted by $C_1$-$C_4$ alkyl, $C_1$-$C_4$ alkoxy, halogen, or nitro. Particularly preferred compounds of formula I are those in which $R^2$ is hydrogen and $R^3$ is hydrogen, methyl, phenyl, or phenyl substituted by $C_1$-$C_4$ alkyl, $C_1$-$C_4$ alkoxy, halogen, or nitro.

Groups $R^4$ $R^5$, $R^6$ and $R^7$ can be hydrogen halogen alkyl, alkoxy, or aryloxy. Preferred embodiments are those in which $R^4$, $R^5$ $R^6$ and $R^7$ are independently hydrogen or halogen (preferably chlorine) and those in which any one or two of $R^4$, $R^5$ $R^6$ and $R^7$ are $C_1$-$C_6$ alkyl (preferably methyl or ethyl), $C_1$-$C_6$ alkoxy (preferably methoxy or ethoxy), or $C_6$-$C_{10}$ aryloxy (preferably phenoxy) and the remaining such groups are hydrogen. Particularly preferred compounds of formula I are those in which $R^4$ $R^5$ $R^6$ and $R^7$ are all hydrogen.

Especially preferred compounds of formula I are those in which $R^2$, $R^3$, $R^4$, $R^5$, and $R^7$ are all hydrogen and $R^1$ is aminocarbonyl, N-($C_1$-$C_4$ alkyl )aminocarbonyl N-phenylaminocarbonyl optionally substituted in the phenyl ring by halogen, alkyl, alkoxy, or alkoxycarbonyl, a group of formula II in which $A^1$ and $A^2$ are hydrogen, or a group of formula III in which $A^1$ and $A^2$ are hydrogen and B is NH. Of these, compounds of formula I in which $R^1$ is aminocarbonyl, N-methylaminocarbonyl, N-ethylaminocarbonyl, or N-phenylaminocarbonyl (optionally chlorinated in the phenyl ring) are most preferred.

The process of this invention involves an initial reaction of a 1,2-dicyanobenzene of formula IV in an organic medium with an alcohol in the presence of a base, preferably at temperatures of about 0° C. to about 100° C., yielding an imino-isoindoline intermediate composition believed to be a compound of formula VIII and/or a compound of formula IX or tautomeric forms thereof

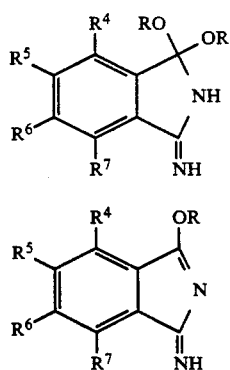

VIII

IX wherein R represents the residue of the alcohol (not including the hydroxyl moiety) from which the hydroxyl hydrogen atom is removed during the reaction. Cf. I. Chainbrier and M. J. Cook, *J. Chem. Research*, 322-323 (1990); see also F. Baumann et al., *Angew. Chem.*, 68, 133-150 (1956). The components can be mixed in any desired order. It may be necessary, depending on the type and concentration of the compounds used, to remove the heat of the reaction by cooling or to accelerate the reaction by heating. In general, the reaction may be carried out in a temperature range in which excessive cooling or heating is avoided, for example, in the preferred range 0° C. to 1000° C. (more preferably in the range of 15° C. to 350° C.).

Suitable alcohols are preferably $C_1$-$C_6$ alkanols and $C_2$-$C_6$ alkanediols or their mono($C_1$-$C_4$ alkyl) ethers. Examples of suitable alcohols include methanol, ethanol, propanol, isopropyl alcohol, butanol, isobutyl alcohol, tert-butyl alcohol, and glycols and glycol derivatives such as ethylene glycol and ethylene glycol monomethyl ether.

Suitable bases must be sufficiently basic to induce the formation of the imino-isoindoline intermediate composition and include, for example, the alkali metal alcoholates of the alcohols used in the reaction. Examples of such bases include sodium methoxide, sodium ethoxide, and potassium tert-butoxide. Other suitable bases include alkali metal hydroxides and alkaline earth metal hydroxides, such as sodium hydroxide, potassium hydroxide, lithium hydroxide, and calcium hydroxide, and alkali metal carbonates or alkaline earth metal carbonates, such as sodium carbonate, potassium carbonate, and calcium carbonate. The preferred bases are alkali metal alcoholates and alkali metal hydroxides. The base serves as a catalyst and thus need not be added in a stoichiometric ratio. If the quantity of base is too small, however, the reaction is too slow and, therefore, uneconomical. It is, therefore, preferred to use about 0.1 to about 1 mole of base relative to 1 mole of 1,2-dicyanobenzene.

Appropriate organic media for the reaction of the 1,2-dicyanobenzene of formula IV with alcohol in the presence of a base are preferably water-miscible organic solvents, such as cyclic or open-chain ethers (for example, dioxane, tetrahydrofuran, ethylene glycol diethyl ether, and oligo- and polyglycols and their ethers); dipolar-aprotic solvents, such as dimethylformamide, N-methylacetamide, and dimethyl sulfoxide; and mixtures thereof, including mixtures with other solvents. Particularly preferred organic media, however, are those in which the alcohol serves as the organic medium.

After the reaction to form the imino-isoindoline intermediate composition is complete, the resultant intermediate composition is not isolated but is converted directly to the semi-condensed product of formula VI by reaction with cyanomethylene compounds of formula V in a molar ratio of about 0.9:1 to about 1.5:1 (preferably at an approximately equimolar ratio of about 1:1) relative to the 1,2-dicyanobenzene of formula IV. The cyanomethylene compound of formula V may optionally be present in the initial reaction mixture. This reaction may be carried out either in the presence or in the absence of water and is carried out at temperatures between about 30° C. and about 100° C. (preferably between 30° C. and 50° C.). The reaction can be accelerated by adding a suitable amount of acid. Suitable acids include mineral acids (such as hydrochloric acid and sulfuric acid), aliphatic and aromatic carboxylic acids, sulfonic acids, and mixtures of the acids. Preferred acids are aliphatic water-soluble carboxylic acids, such as formic acid, acetic acid, and propanoic acid.

It is particularly advantageous to obtain the semi-condensed product of formula VI (that is, the monosubstituted intermediate) in the purest form possible before it is further condensed to form the asymmetrically disubstituted isoindoline products. Although this objective can be achieved by isolating the semi-condensed product at this point, it has surprisingly been found that the process of the present invention gives the desired asymmetric pigments in good yields and high purity even when the monosubstituted intermediate is not isolated. Thus, it is possible to avoid the need for isolation procedures and the need to add additional organic medium for the final condensation step. Consequently, it is particularly preferred to carry out the final condensation step of the invention without first isolating the monosubstituted intermediate. However, regardless of whether or not the intermediate is isolated, it is important to allow condensation of the cyanomethylene compound of formula V to proceed to completion before carrying out the subsequent condensation reaction.

Asymmetrically disubstituted isoindolines of formula I are prepared by reaction of the semi-condensed product of formula VI with barbituric acid or an appropriate derivative of barbituric acid in the presence of water. If the semi-condensed product of formula VI is first isolated, an additional quantity of organic medium (preferably but not necessarily the same as that used in the preceding steps) and water must be added. On the other hand, if the semi-condensed product of formula VI is not isolated, additional organic medium need not be added. Instead, barbituric acid or an appropriate derivative of barbituric acid is added in the presence of water (if not already present in the preceding step) to the reaction mixture containing unisolated semi-condensed product. Barbituric acid or a derivative thereof is added in a molar ratio, relative to the 1,2-dicyanobenzene of formula IV, of about 1:1 to about 3:1 (preferably 1:1 to 2:1) at a pH between about 1 and about 6 (preferably between 2 and 5). An artionic, cationic, or neutral surfactant may optionally be added during the reaction of the cyanomethylene compound of formula V or before or after condensation of the barbituric acid or derivative of formula VII. The condensation reaction is carried out at temperatures of from about 30° C. to about 100° C., preferably from 50° C. to 80° C. When the reaction is carried out under reflux conditions, the preferred temperature range of 50° C. to 80° C. can easily be maintained by appropriate selection of the organic medium. However, if a volatile organic medium (such as lower alcohol), is to be removed, a temperature of up to about 100° C. (the boiling point of water) can be used.

When prepared according to the process of the invention, the pigments of formula I are obtained with high purity as determined by comparison of infrared spectra of these pigments with those obtained by methods described, for example, in U.S. Pat. No. 3,794,659. The products obtained by the process of the invention are obtained in good yield and exhibit high brilliance and color strength, have good light- and weather-fastness, and are easily dispersed.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are percentages by weight.

DESCRIPTION OF THE PREFERRED EMBODIMENTS

Example 1

1,2-Dicyanobenzene (24.8 g, 0.194 mol) was added with stirring to 130 mL of methanol at 20–25° C., followed by gradual addition of 18 g (0.10 mol) of 30 wt % sodium methoxide in methanol at 20–25° C. The reaction mixture was allowed to stir at 20°–25° C. for 4 hours. The reaction was monitored by thin-layer chromatography (tlc) on silica gel using 95:5 (by volume) chloroform/ethanol as eluent until 1,2-dicyanobenzene was no longer detected. 2-Cyanoacetamide (18.1 g, 0.215 mol) was added to the resultant solution, followed by 11.5 mL (0.201 mol) of glacial acetic acid. The mixture was stirred at 40° C. for 2 hours and then at 65° C. for 7 hours. The reaction was monitored by tlc on silica gel using 80:20 (by volume) toluene/methanol as eluent until the dimethoxy intermediate was no longer detected. The resultant suspension was cooled to 40° C. Barbituric acid (27.3 g, 0.213 mol) was added, followed by the addition of 15 mL (0.262 mol) of glacial acetic acid and 385 mL of water. The suspension was then heated to 65° C. and held at that temperature for 5 hours. The product was filtered while still warm and washed with water until salt-free to give 60.5 g (96.5%, based on the dicyanobenzene) of a yellow pigment having the formula

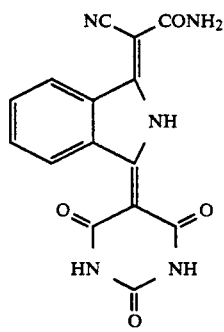

An infrared spectrum of this material is the same as that of a pigment synthesized from amino-imino-isoindoline (see formula (A)) following the procedure described in Example 76 of U.S. Pat. No. 3,794,659. Mass spectrometry of this material exhibited a molecular ion at m/e 323, with no indication of impurities from symmetrically substituted products. The analytical data indicate that the desired asymmetric isoindoline pigment was synthesized.

Example 2

The procedure described in Example 1 was repeated except for using 5.0 g of sodium hydroxide instead of sodium methoxide solution and ethanol instead of methanol. The first two steps were monitored by tlc as in Example 1. A yellow pigment having an IR spectrum identical to the material of Example 1 was obtained.

Example 3

The procedure described in Example 1 was repeated except for using 10.4 g of potassium carbonate instead of the sodium methoxide solution. The first two steps were monitored by tlc as in Example 1. A yellow pigment having an IR spectrum identical to the material of Example 1 was produced.

Examples 4–27

The procedure described in Example 1 was repeated using the cyanomethylene compounds of formula V and barbituric acid derivatives of formula VII having the substituents listed in the following Table to prepare the corresponding compounds of formula I. The first two reaction steps were monitored by tlc as in Example 1. The pigments were obtained with qualities similar to those of Example 1 and exhibited the hues indicated in the Table.

TABLE

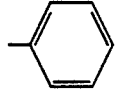

| Example | $R^1$ | $R^2$ | $R^3$ | Hue |
|---|---|---|---|---|
| 4 | —CONH$_2$ | H | —CH$_3$ | yellow |
| 5 | —CONH$_2$ | H | —CH$_2$CH$_3$ | yellow |
| 6 | —CONH$_2$ | H | 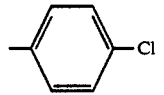 | yellow |
| 7 | —CONH$_2$ | H | 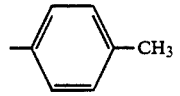 —Cl | yellow |
| 8 | —CONH$_2$ | H | 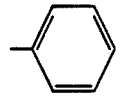 —CH$_3$ | yellow |
| 9 | —CONH$_2$ | —CH$_3$ | —CH$_3$ | yellow |
| 10 | —CONHCH$_3$ | H | H | yellow |
| 11 | —CONHCH$_3$ | H | —CH$_3$ | yellow |
| 12 | —CONHCH$_3$ | —CH$_3$ | —CH$_3$ | yellow |
| 13 | —CONHCH$_3$ | H | 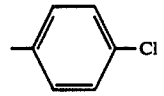 | yellow |
| 14 | —CONHCH$_3$ | H | 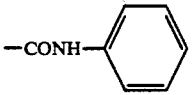 —Cl | yellow |
| 15 | —CONHCH$_2$CH$_3$ | H | H | yellow |
| 16 | —CN | H | H | yellow |
| 17 | —CONH— 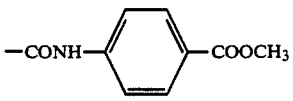 | H | H | yellow |
| 18 | —CONH—⌬—COOCH$_3$ | H | H | yellow |

TABLE-continued

[Structure: isoindoline with NC-C(R¹)= group on one side and =C connected to barbituric acid ring with NR² and NR³ substituents]

| Example | R¹ | R² | R³ | Hue |
|---|---|---|---|---|
| 19 | —CONH—(phenyl with COOCH₃ and COOCH₃) | H | H | yellow |
| 20 | —CONH—(phenyl)—Cl | H | H | yellow |
| 21 | —CONH—(phenyl)—CH₃ | H | H | yellow |
| 22 | —CONH—(phenyl)—OCH₂CH₃ | H | H | yellow |
| 23 | —CONH—(phenyl)—Cl | H | (phenyl)—OCH₃ | orange |
| 24 | —CONH—(phenyl) | H | (phenyl)—NO₂ | orange |
| 25 | —CONH—(phenyl)—Cl | H | (phenyl)—Cl | orange |
| 26 | —COO—(phenyl) | H | H | yellow |
| 27 | —COOCH₃ | H | H | yellow |
| 28 | II (A¹ = A² = H) | H | H | orange |
| 29 | III (A¹ = A² = H) | H | H | red |

What is claimed is:

1. A process for preparing an asymmetric isoindoline pigment of the formula

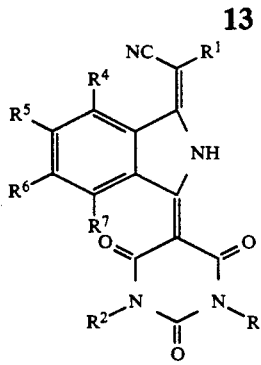

wherein
R¹ is an electron-withdrawing group;
R² and R³ are independently
  (1) hydrogen,
  (2) $C_1$–$C_6$ alkyl, or
  (3) $C_6$–$C_{10}$ aryl; and
R⁴, R⁵, R⁶, and R⁷ are independently
  (1) hydrogen,
  (2) halogen,
  (3) $C_1$–$C_6$ alkyl,
  (4) $C_1$–$C_6$ alkoxy, or
  (5) $C_6$–$C_{10}$ aryloxy; comprising
    (a) reacting a 1,2-dicyanobenzene of the formula

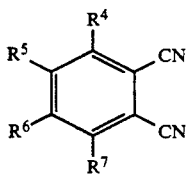

wherein R⁴, R⁵, R⁶, and R⁷ are defined as above, with an alcohol in an organic medium in the presence of a base, thereby forming an imino-isoindoline intermediate composition;

(b) reacting the imino-isoindoline intermediate composition, without first isolating said intermediate composition, with 0.9 to 1.5 molar parts, relative to the 1,2-dicyanobenzene, of a cyanomethylene compound of the formula

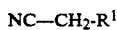

NC—$CH_2$-R¹ wherein
R¹ is an electron-withdrawing group that under the reaction conditions does not decompose or undergo significant chemical reactions to form a group that is not itself an electron-withdrawing group,
thereby forming a semi-condensed product of the formula

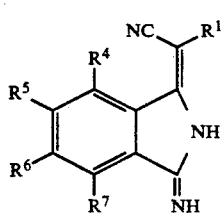

wherein R¹ is an electron-withdrawing group and R⁴, R⁵, R⁶, and R⁷ are defined as above; and (c) isolating the semi-condensed product and then condensing said semi-condensed product in the presence of water at a temperature of 30° C. to 100° C. and at a pH between 1 and 6 with 1 to 3 molar parts, relative to the 1,2-dicyanobenzene, of a barbituric acid derivative of the formula

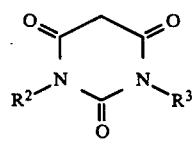

wherein R² and R³ are defined as above, thereby forming the asymmetric isoindoline pigment.

2. A process according to claim 1 wherein R¹ is an electron-withdrawing group selected from the group consisting of
  (1) cyano,
  (2) aminocarbonyl or aminocarbonyl N-substituted with $C_1$–$C_6$ alkyl, $C_5$–$C_7$ cycloalkyl, $C_7$–$C_{15}$ aralkyl, or $C_6$–$C_{10}$ aryl,
  (3) ($C_1$–$C_6$ alkoxy)carbonyl,
  (4) ($C_6$–$C_{10}$ aryloxy)carbonyl,
  (5) heteroaryl selected from the group consisting of
    (a) a group of the formula

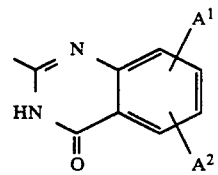

wherein A¹ and A² are independently hydrogen, halogen, $C_1$–$C_6$ alkyl, $C_1$–$C_6$ alkoxy, or ($C_1$–$C_6$ alkoxy)carbonyl, or A¹ and A² together form a fused-on benzene ring, and (b) a group of the formula

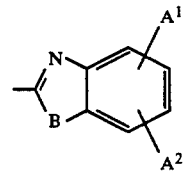

wherein A¹ and A² are defined as above and B is O, S, NH, or N($C_1$–$C_4$ alkyl).

3. A process according to claim 1 wherein R¹ is aminocarbonyl; N-$C_1$–$C_4$ alkyl)aminocarbonyl; N-phenylaminocarbonyl or N-phenylaminocarbonyl substituted in the phenyl ring by halogen, alkyl, alkoxy, or alkoxycarbonyl; a group of the formula

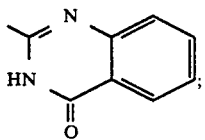

or a group of the formula

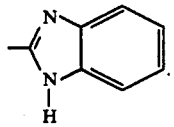

4. A process according to claim 1 wherein $R^2$ and $R^3$ are independently hydrogen, $C_1$–$C_4$ alkyl, phenyl, or phenyl substituted by $C_1$–$C_4$ alkyl, $C_1$–$C_4$ alkoxy, halogen, or nitro.

5. A process according to claim 1 wherein $R^4$, $R^5$, $R^6$, and $R^7$ are hydrogen.

6. A process according to claim 1 wherein the alcohol in step (a) is a $C_1$–$C_6$ alkanol, a $C_2$–$C_6$ alkanediol, or a mono($C_1$–$C_4$ alkyl) ether of a $C_2$–$C_6$ alkanediol.

7. A process according to claim 1 wherein the alcohol in step (a) serves as the organic medium.

8. A process according to claim 1 wherein the base in step (a) is an alkali metal alcoholate, an alkali metal hydroxide, an alkaline earth metal hydroxide, an alkali metal carbonate, or an alkaline earth metal carbonate.

9. A process according to claim 1 wherein reaction step (a) is carried out at a temperature of 15° C. to 35° C.

10. A process according to claim 1 wherein reaction step (b) is carried out at a temperature of 30° C. to 50° C.

11. A process according to claim 1 wherein reaction step (b) is carried out in the presence of water.

12. A process according to claim 1 wherein in step (b) an equimolar ratio of the cyanomethylene compound is sued relative to the 1,2-dicyanobenzene.

13. A process according to claim 1 wherein the condensation reaction in step (c) is carried out at a temperature of 50° C. to 80° C;

14. A process according to claim 1 wherein the condensation reaction in step (c) is carried out at a pH between 2 and 5.

15. A process according to claim 1 for preparing an asymmetric isoindoline pigment of the formula

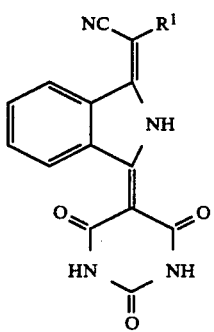

wherein $R^1$ is aminocarbonyl; N-($C_1$–$C_4$ alkyl)aminocarbonyl; N-phenylaminocarbonyl or N-phenylaminocarbonyl substituted in the phenyl ring by halogen, alkyl, alkoxy, or alkoxycarbonyl; a group of the formula

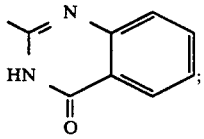

or a group of the formula

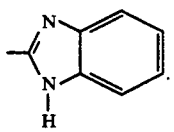

comprising
(a) reacting 1,2-dicyanobenzene of the formula

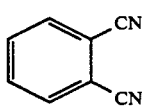

with an alcohol in an organic medium in the presence of a base, thereby forming an imino-isoindoline intermediate composition;

(b) reaction the imino-isoindoline intermediate composition, without first isolating said intermediate composition, with 0.9 to 1.5 molar parts, relative to the 1,2-dicyanobenzene, of a cyanomethylene compound of the formula

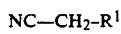

wherein $R^1$ is defined as above, thereby forming a semi-condensed product of the formula

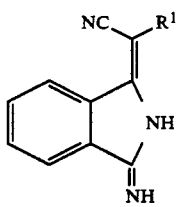

wherein $R^1$ is defined as above; and (c) isolating the semi-condensed product and then condensing said semi-condensed product in the presence of water at a temperature of 30° C. to 100° C. and at a pH between 1 and 6 with 1 to 3 molar parts, relative to the 1,2-dicyanobenzene, of barbituric acid of the formula

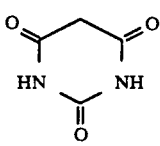

thereby forming the asymmetric isoindoline pigment.

16. A process according to claim 1 for preparing an asymmetric isoindoline pigment of the formula

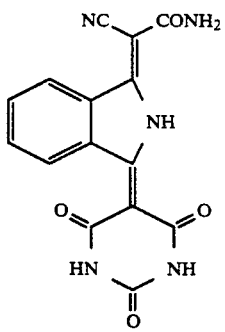

comprising
(a) reacting 1,2-dicyanobenzene of the formula

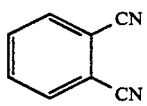

with an alcohol in an organic medium in the presence of a base, thereby forming an amino-isoindoline intermediate composition;
(b) reacting the imino-isoindoline intermediate composition, without first isolating said intermediate composition, with 0.9 to 1.5 molar parts, relative to the 1,2-dicyanobenzene, of a cyanomethylene compound of the formula

NC—CH$_2$—CONH$_2$ thereby forming a semi-condensed product of the formula

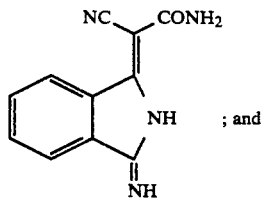 ; and (c) isolating the semi-condensed product and then condensing said semi-condensed product in the presence of water at a temperature of 30° C. to 100° C. and at a pH between 1 and 6 with 1 to 3 molar parts, relative to the 1,2-dicyanobenzene, of barbituric acid of the formula

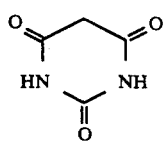

thereby forming the asymmetric isoindoline pigment.

* * * * *